United States Patent [19]

Himes et al.

[11] Patent Number: 5,248,956
[45] Date of Patent: Sep. 28, 1993

[54] ELECTRONICALLY CONTROLLABLE RESISTOR

[75] Inventors: Glenn S. Himes; Catherine Q. Xu; Bradford W. Holcombe, all of Charlottesville, Va.

[73] Assignee: Center For Innovative Technology, Herndon, Va.

[21] Appl. No.: 681,138

[22] Filed: Apr. 5, 1991

[51] Int. Cl.[5] .............................. H01C 13/00
[52] U.S. Cl. ..................... 338/334; 257/536; 338/260; 338/295
[58] Field of Search ............ 338/334, 260, 295, 200; 323/354; 257/528, 536, 537

[56] References Cited

U.S. PATENT DOCUMENTS

| | | |
|---|---|---|
| 3,430,203 | 6/1966 | Crawford . |
| 4,551,705 | 11/1985 | Anderson ............... 357/23.1 X |
| 4,782,460 | 11/1988 | Spencer . |
| 4,807,168 | 2/1989 | Moopenn et al. . |
| 4,810,949 | 3/1989 | Schiemenz et al. . |
| 4,839,700 | 6/1989 | Ramesham et al. . |
| 4,866,645 | 9/1989 | Lish . |
| 4,945,257 | 7/1990 | Marrocco, III . |
| 5,045,832 | 9/1991 | Tam ........................ 338/334 |
| 5,065,132 | 11/1991 | Taddiken et al. ............ 338/334 |

OTHER PUBLICATIONS

"Self Adjusting Weights for Hardware Neural Networks" by R. M. Inigo, A. Bonde, Jr., B. Holcombe.
"Analog Hardware Implementation of Neocognitron Networks", by R. M. Inigo, Allen Bonde, Jr., Bradford Holcomb; Dept. of Electrical Engineering, UVA.

Primary Examiner—Marvin M. Lateef
Attorney, Agent, or Firm—Whitham & Marhoefer

[57] ABSTRACT

An electronically controllable resistor (ECR) which functions as a fixed or variable resistor over a wide range of operating conditions. The value of the resistance may be altered in a highly linear fashion by altering a digital input thereto. The ECR utilizes an array of transmission gates, preferably having a uniform inherent resistance and preferably fabricated using CMOS technology which are grouped in commonly controlled groups. Each group preferably contains a number of transmission gates which relates to the numbers of transmission gates in other groups in a binary fashion. The source of digital control signals is preferably provided by a digital memory device which can be integrated with the transmission gate array. An operational amplifier can also be provided on the chip to form a complete neural processing element for inclusion in large neural networks.

44 Claims, 8 Drawing Sheets

| Wp,Wn,Lp,Ln(um) | CRR(v) | Rmax(KΩ) | Rmin(KΩ) | Rmax/Rmin | Raver(KΩ) | Imax(mA) |
|---|---|---|---|---|---|---|
| 8,4,4,4 | 2.5-5.0 | 12.2 | 4.48 | 2.72 | 9.76 | 0.421 |
| 12,4,4,4 | 2.05-4.9 | 10.6 | 4.48 | 2.37 | 8.81 | 0.529 |
| 16,4,4,4 | 1.8-4.0 | 9.73 | 4.48 | 2.17 | 8.11 | 0.637 |
| 20,4,4,4 | 1.6-3.5 | 9.18 | 4.48 | 2.05 | 7.57 | 0.745 |

| Wp,Wn,Lp,Ln(um) | CRR(v) | Rmax(KΩ) | Rmin(KΩ) | Rmax/Rmin | Imax(mA) |
|---|---|---|---|---|---|
| 12,4,4,4 | 2.05-4.9 | 10.6 | 4.48 | 2.37 | 0.529 |
| 24,8,4,4 | 2.1-5.0 | 5.18 | 2.25 | 2.30 | 1.07 |
| 48,16,4,4 | 2.1-5.0 | 2.58 | 1.14 | 2.25 | 2.12 |
| 96,32,4,4 | 2.1-5.0 | 1.30 | 0.593 | 2.19 | 4.15 |

| Wp,Wn,Lp,Ln(um) | CRR(v) | Rmax(KΩ) | Rmin(KΩ) | Rmax/Rmin | Raver(KΩ) | Imax(mA) |
|---|---|---|---|---|---|---|
| 8,4,4,4 | 2.2-5.0 | 9.58 | 4.42 | 2.17 | 8.16 | 0.537 |
| 12,4,4,4 | 1.5-5.0 | 7.93 | 4.42 | 1.80 | 7.04 | 0.704 |
| 16,4,4,4 | 1.1-4.0 | 7.00 | 4.42 | 1.59 | 6.27 | 0.869 |
| 20,4,4,4 | 0.75-3.4 | 6.39 | 4.42 | 1.45 | 5.70 | 1.03 |

| Wp,Wn,Lp,Ln(um) | CRR(v) | Rmax(KΩ) | Rmin(KΩ) | Rmax/Rmin | Raver(KΩ) | Imax(mA) |
|---|---|---|---|---|---|---|
| 8,4,4,4 | 2.4-5.0 | 8.22 | 5.31 | 1.55 | 7.20 | 0.641 |
| 12,4,4,4 | 1.6-4.8 | 6.97 | 5.31 | 1.31 | 6.40 | 0.819 |
| 16,4,4,4 | 0.35-4.2 | 6.20 | 5.02 | 1.23 | 5.82 | 0.995 |
| 20,4,4,4 | 0.0-3.5 | 5.88 | 4.28 | 1.37 | 5.37 | 1.17 |

ELECTRONICALLY CONTROLLABLE RESISTOR

BACKGROUND OF THE INVENTION

1. Field of the Invention

The present invention generally relates to resistive electronic circuit elements and, in particular, to resistance elements in which resistance may be controlled electronically.

2. Description of the Prior Art

Perhaps the most basic of all electronic circuit elements is the resistor and the property of resistance is inherent in all materials capable of carrying an electric current. So-called linear networks are comprised entirely of interconnected resistances. Such linear networks are often used for generating a plurality of differing voltages from one or more voltages which may be applied at different parts of the network. More generally, the resistance values placed in a circuit may affect any electronic circuit in many ways, such as establishing the gain of an amplifier, the time constant of a delay or filter circuit or the response of a feedback circuit, which, in turn, may have applicability to a wide variety of circuits such as digital to analog converters, oscillators, tuners, threshold circuits and the like.

Resistive circuit elements (e.g. resistors) generally have a resistance element formed of a material such as carbon which has a highly predictable specific resistance. The desired resistance value is then obtained by alteration of the geometry of the resistance element. Increasing the length of the resistance element between highly conductive terminals attached thereto will increase the resistance value. Increasing cross-sectional area of the element between such terminals will decrease resistance and increase the ability of the resistance element to dissipate heat. The accuracy of the geometry of the resistance element will determine the accuracy of the resistance value. For this reason, also, it is very difficult to alter the resistance value without human intervention. Moreover, it is impossible to reversibly alter the resistance value of the resistance element of this type of resistor. Therefore, this type of resistance element is generally referred to as a fixed resistor and alteration of the resistance value requires irreversible physical trimming or removal and substitution of such fixed resistors.

As a practical matter, however, the formation of high accuracy resistors is expensive. In many applications, high accuracy of resistance values is not required and tolerances of 5% and 10% are common. It is also possible to design circuits so that a large plurality of low tolerance network elements can be adequately compensated by a small number of variable resistors.

The typical form of known variable resistor is known as the potentiometer and takes the form of a resistance element and a wiper element which makes contact with the resistance element at an adjustable location along its length to determine the value of the resistance which will be placed in the circuit or to establish a ratio of resistance values having a fixed sum. While this is satisfactory for many applications, the adjustment of the resistance value is mechanical and insusceptible of electronic control without resort to servo systems and the like. Also, both the resistance element and the wiper element are subject to wear, tending to alter the resistance value of the resistance element and reduce the reliability of the circuit. Therefore, use of such variable resistors is preferably limited to applications where convenient manual control is necessary or changes of resistance value will not often be required.

Electronic control of resistance value may therefore be desirable to enhance the speed and accuracy of adjustment of resistor value and also to allow remote control of the resistance where the resistance may be inaccessible, as in airborne systems or particularly large or complex circuits or systems. The ability to electronically alter resistance values is often a key to design of adaptive circuits which can be arranged to alter function based on the nature of the input signal, often under computer control.

A particular type of adaptive circuit which has been the subject of recent interest is the so-called artificial neural network (ANN). Neural networks attempt to model the ability of the human brain to learn in order to solve problems which are difficult for conventional computer programs. In fact, the difficulty in the application of conventional computers may lie in the lack of consistent knowledge of the problem to be solved, the lack of a known algorithm for solving the problem or, where the solution is highly dependent on the input information, the lack of knowledge of the nature of input data. Such problems are typically encountered in speech or pattern recognition, image processing and vehicle guidance. However, neural networks can have applicability to virtually any type of application where it may be desired to alter the function performed in a manner which is wholly or partially determined by accumulated information. Neural networks can accumulate and generalize input patterns until they develop synapse weight values, collectively resulting in algorithms which determine solutions to the problem.

Neural networks, in order to simulate learning of complex problems, rely upon a characteristic highly parallel structure. Despite the potential of neural networks and the amount of effort which has recently been expended in their development, neural networks have not been particularly successful in practice. When computer control or simulation of neural networks with a high degree of parallelism is done, the sequential nature of digital computers results in poor response times. When parallel processing is attempted with massive cellular arrays of processors, the amount of hardware required is prohibitive for all but the simplest of applications. For instance, hundreds of thousands of processing elements may be necessary to perform pattern recognition tasks of routine complexity. The hardware requirements cannot easily be met since such numbers of processing elements dictate replication of processors at the chip level by VLSI techniques. No suitable structure for providing local memory, developing a synapse weight value and modulating the incoming signals in accordance with the synapse weight has been developed which could be integrated on a semiconductor chip.

Digital designs of neural networks have the advantage of having good noise immunity, tolerance for differences from chip to chip and ease of interfacing with digital computing machinery and digital communication networks. However, digital implementations for neural networks have much larger and more complicated designs than analog implementations. Digital implementations also typically require much greater bandwidth and are inherently much slower than analog implementations due to sequential iteration of many parallel paths.

Analog designs, while offering greater simplicity and speed of operation, usually rely on sample-and-hold weight circuits with continuous voltage or current levels as inputs. These sample-and-hold circuits require circuitry to provide periodic refresh and large chip areas for storage capacitors. Sample-and-hold circuits are also sensitive to noise and chip-to-chip variations of devices. For this reason, analog implementations of neural networks remain difficult to design and realize.

SUMMARY OF THE INVENTION

It is therefore an object of the present invention to provide an electronically controllable resistor which can be fabricated by integration on a semiconductor chip, preferably together with high-speed digital processing circuitry.

It is another object of the invention to provide a circuit which is digitally controllable to provide an accurately controlled resistance.

It is yet another object of the invention to provide a hybrid circuit which will store a digital value and control a resistance therewith.

It is a further object of the invention to provide an element of a synapse of a neural network which can be integrated together with digital processing circuitry on a single chip by VLSI techniques.

It is another further object of the invention to provide a neural network implementation which will combine the advantages available in both analog and digital implementations of neural networks while avoiding the disadvantages of either of these implementations.

It is yet another further object of the invention to provide an electronic component which can be formed at a small size and function in a manner similar to a fixed resistor but yet allow accurate digital control over a wide range of resistance values.

In order to accomplish the above and other objects of the invention, a resistor is provided comprising, in combination, a digital storage means for storing at least two digits of a signal, and a transmission gate array comprising at least two transmission gates, each said transmission gate being associated with a respective electrical resistance and controllable by a respective one of said digits.

In accordance with another aspect of the invention, a method of controlling an electrical resistance is provided including the step of controlling at least one transmission gate associated with a predetermined resistance with a digit of a multi-digit signal.

In accordance with a further aspect of the invention, a neural processing element is provided comprising at least two resistors, each said resistor having a terminal connected to a common node and comprising a transmission gate array comprising at least two transmission gates, each said transmission gate being associated with a respective electrical resistance and controllable by a respective digit of a multi-digit signal.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
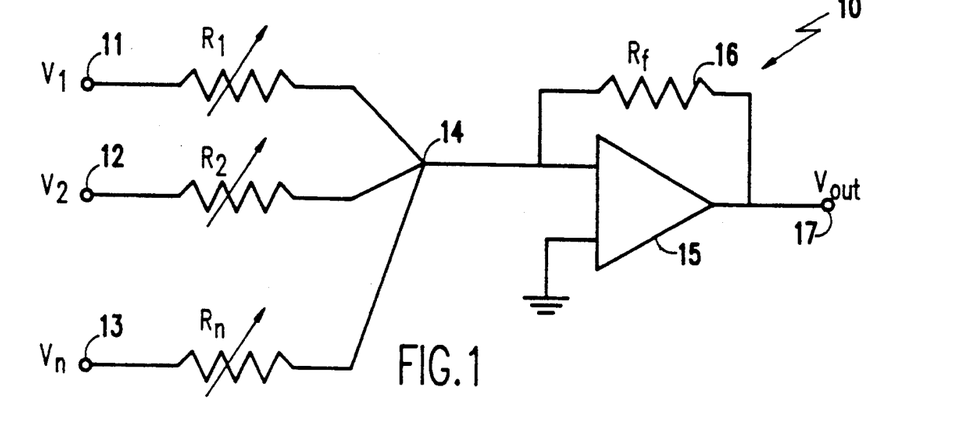
FIG. 1 is a diagram of a typical neural processing element.

Referring now to the drawings, and more particularly to FIG. 1, there is shown a diagram of an electrical circuit comprising a typical neural processing element of an artificial neural network (ANN), with respect to which the invention will be explained since the electronically controllable resistor (ECR) according to the invention is deemed to be most advantageously applicable to such a circuit. It is also believed that the advantages of the invention in diverse types of electrical and electronic circuits will be most readily understood and appreciated by a discussion of the invention in the context of a neural processing element. However, it is to be understood that the ECR of the invention is equally applicable to any electrical circuit in which a fixed or variable resistor can be used.

The neural element 10 of FIG. 1 is similar to a multi-channel mixing circuit. Input terminals 11, 12, 13 receive input voltages $V_1$-$V_n$ which are attenuated by variable resistors $R_1$-$R_n$, respectively, so that a weighted sum of the input voltages appears at mixing node 14, forming one of two differential inputs to amplifier 15. Amplifier 15 can be of any type with high gain but is preferably configured as an operational amplifier having a feedback path 16 formed by resistor $R_f$. As is well understood in the art, the ratio value of $R_f$ to each of $R_1$-$R_n$ determines the relative gain of the amplifier for each respective input signal. Therefore amplifier 15, feedback resistor $R_f$ and resistors $R_1$-$R_n$ function together as a weighted summer. It may be desirable to provide for adjustment of $R_f$ for the purpose of adjusting output levels or relative gain.

When such a circuit is used as a mixer circuit, such as for the mixing of audio signals, variable resistors $R_1-R_n$ would typically be embodied by potentiometers to control how the input signals are weighted during mixing. The circuit operates in the same way when used as a neural processing element except that automatic control of the weights (e.g. the conductance of the variable resistances) is provided.

Figure 2:
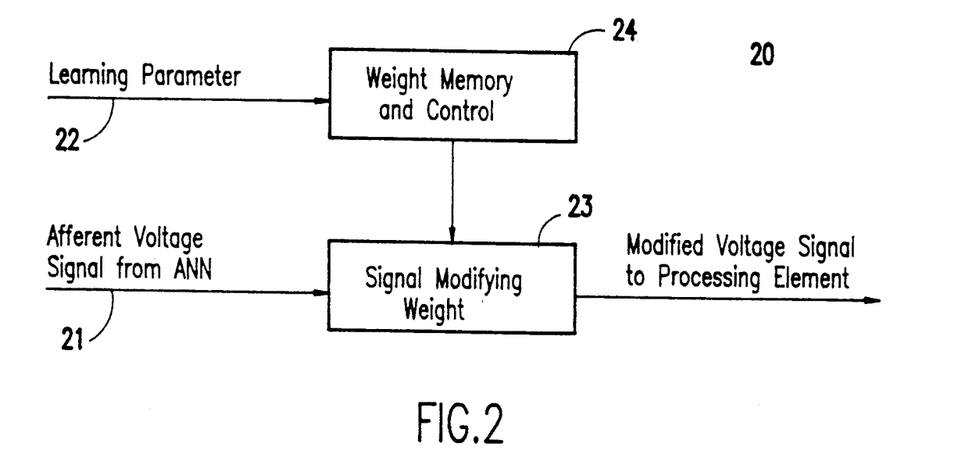
FIG. 2 is a block diagram showing the development of a general neural weight.

Referring now to FIG. 2, the automatic control of the neural weights will be described. The structure of FIG. 2 corresponds to one or more of the variable resistances $R_1-R_n$ of FIG. 1. An input signal corresponding to one of inputs 11-13 is applied to terminal 21 which is modulated by the weighting circuit 23, which is typically a resistance, to provide an output. Depending on the results of subsequent processing, a learning parameter is developed and input to a weight memory and control 24 by way of terminal 22. The weight memory holds data reflecting the weight for modulation of the input signal 21 and controls adjustment of the resistance 23 in accordance with that data.

Figure 3:
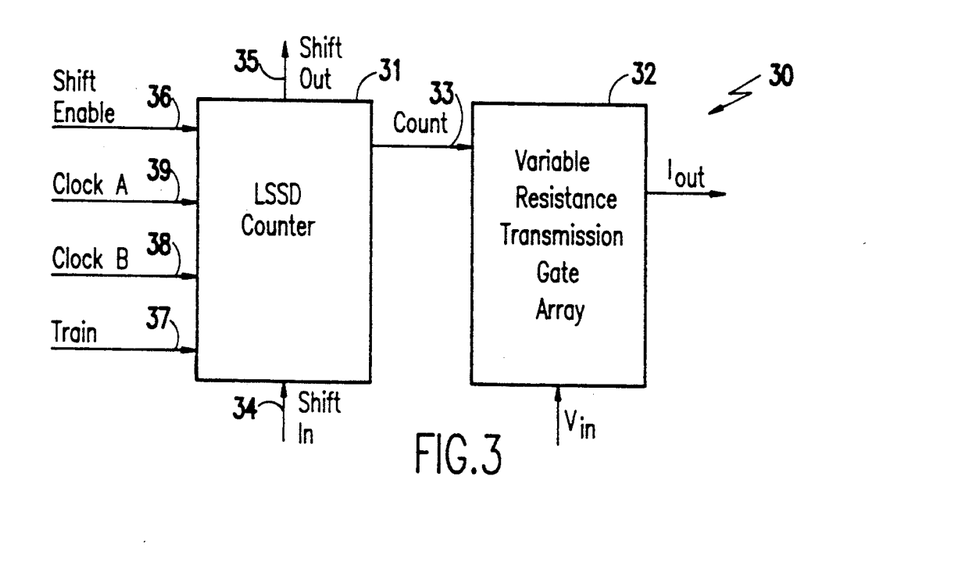
FIG. 3 is a block diagram showing the architecture of the electronically controllable resistor according to the invention.

Referring now to FIG. 3, the electronically controllable resistor 30, according to the invention, will now be explained. While the data held by weight memory 24 could potentially be in any form, in accordance with an important aspect of the invention, the data is preferably digital to allow digital control of the resistance. While the digital signals may be in any coded form (e.g. multi-level, tri-state, gray code, etc.) and are not limited to binary form or any particular code (e.g. "excess-3", BCD, etc.), the invention can be implemented in the most straightforward manner by using binary signals of plural digits as the digital signal. Storage of the digital signal can be accomplished by any type of circuit capable of storing digital, such as a memory cell array including, but not limited to DRAMs, SRAMs, long-term SRAMs, PROMs (which are deemed particularly preferable where the ECR is used for adjustment during manufacture of an electronic device) or, particularly for purposes of integration of a dynamically adjustable ECR on a single chip, shift registers or counters. As applied to a neural processing element, however, it is deemed preferable to use a level sensitive scan design (LSSD) counter. Such a counter has a plurality of outputs 33 for providing the data contained therein to a transmission gate array 32, as well as a shift-out terminal 35 to serially shift the contents out to another device. This feature is particularly useful for fault detection and results in improved fault tolerance (observability and controllability) of the entire combination. However, for some applications, other storage devices such as memory cell arrays and shift registers may be implemented to achieve other benefits such as size reduction. Shift-in terminal 34 similarly allows the counter to be preset to any desired value or reset by shifting in a string of zeroes of appropriate length. Both shifting in and shifting out operations are carried out under control of signals on shift enable terminal 36 and clock terminals 38, 39. When shifting is not enabled and the train mode is asserted by application of an appropriate signal to terminal 37, the application of non-overlapping clock pulses, Clock A and Clock B, will cause incrementing of the value in the counter to alter (e.g. decrease) resistance of the ECR. When the train mode is not asserted, the contents of the counter will not change. Suitable interlocks can be provided during shifting and reset operations to avoid modulation of an input signal by an erroneous value. However, it should be noted that the speed of operation of the ECR arrangement of FIG. 3 is almost entirely dependent on the cycle time of the LSSD counter which is preferably made very fast (e.g. 200 ns, which can be achieved consistent with integration on a single chip). Therefore, shifting operations need not cause any substantial interference with the operation of the neural processor 30.

In accordance with a preferred embodiment of the invention, the resistive element of the ECR is embodied by an array of transmission gates. Essentially the transmission gate array (TGA) will consist of a network of switches and resistances which can be selectively combined, under digital control, to provide a net or lumped resistance for the array. In accordance with a preferred embodiment of the invention, all resistances in the TGA may have the same value and are connected in commonly controlled groups having a binarily weighted number of resistances and switches to develop the desired resistance in accordance with the data in the weight memory. Alternatively, binarily weighted resistances may be connected in parallel. In an embodiment particularly appropriate for use in neural networks, the switches are preferably formed as field effect transistor transmission gates with the channel lengths and widths configured to have a predetermined resistance so that, in dependence on a digital 1 or 0 applied to a gate electrode, each FET will appear as either a fixed resistance or an open circuit.

Figure 4:
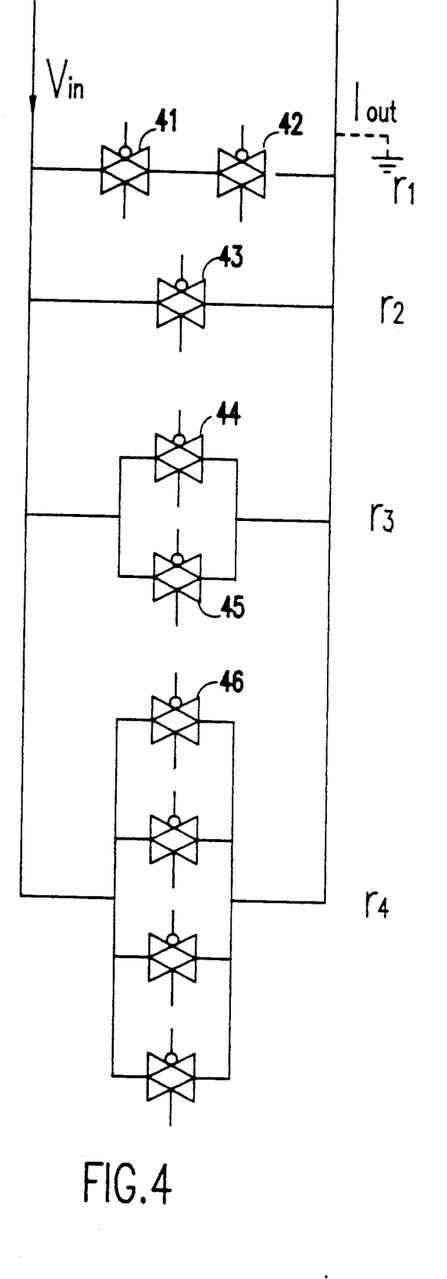
FIGS. 4, 5 and 6 show different transmission gate array configurations in accordance with the invention.

FIG. 4 shows one form of a gate array useable in the present invention. The transmission gate array of FIG. 4 shows four parallel connected transmission gate groups constituting resistors $r_1-r_4$. Each of these transmission gates is configured to have the same resistance. Resistor $r_2$ comprises a single transmission gate 43, $r_3$ comprises a parallel connected and commonly controlled pair of transmission gates 44 and 45 and $r_4$ comprises four parallel connected and commonly controlled transmission gates 46 while $r_1$ comprises a serially connected pair of commonly controlled transmission gates 41, 42. Thus, the resistances of each of resistances $r_1-r_4$ are related in a binary weighted sequence. However, in practice, since transmission gates 41, 42 have only half of $V_{in}$ applied across their respective conduction terminals, the operating conditions for transmission gates 41, 42 will be different from transmission gates 43-46 and performance will not be as linear as theory would indicate. Nevertheless, this array uses the fewest components, requiring relatively little chip area and may be preferred where linearity is not of primary importance. It should be understood that additional groups could be formed using eight, sixteen, etc. groups of parallel resistors. However, for applications having relatively low $V_{in}$, additional groups having greater numbers of series connected transmission gates are unlikely to be satisfactory.

Figure 5:
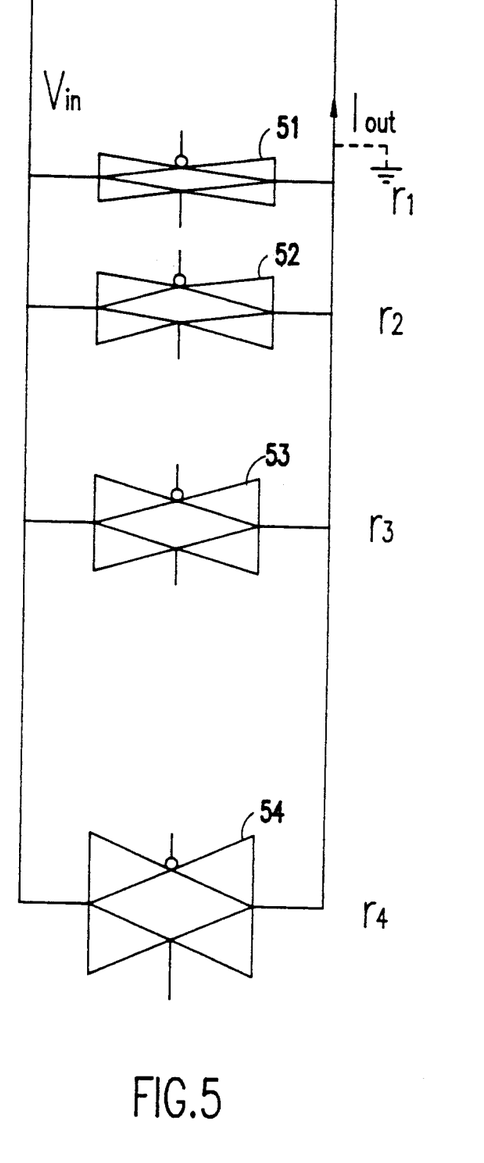

The transmission gate array of FIG. 5 also requires only a moderate amount of chip space and has a particularly simple connection layout. In this case, transmission gates 51-54 have their geometries arranged to have resistances which are binarily related. However, the potential of small size may not be fully exploited since non-linear scaling effects may be encountered when the transmission gates are made at small sizes where second order effects regarding electrical characteristics of the devices may be significant. Therefore, the desired binary weighting of resistances $r_1-r_4$ will not be inherently achieved during fabrication. However, an array of this nature may be useful for relatively higher power or higher resistance value applications where discrete resistance elements may be formed on the chip and transmission gate resistance is small in comparison thereto.

Figure 6:
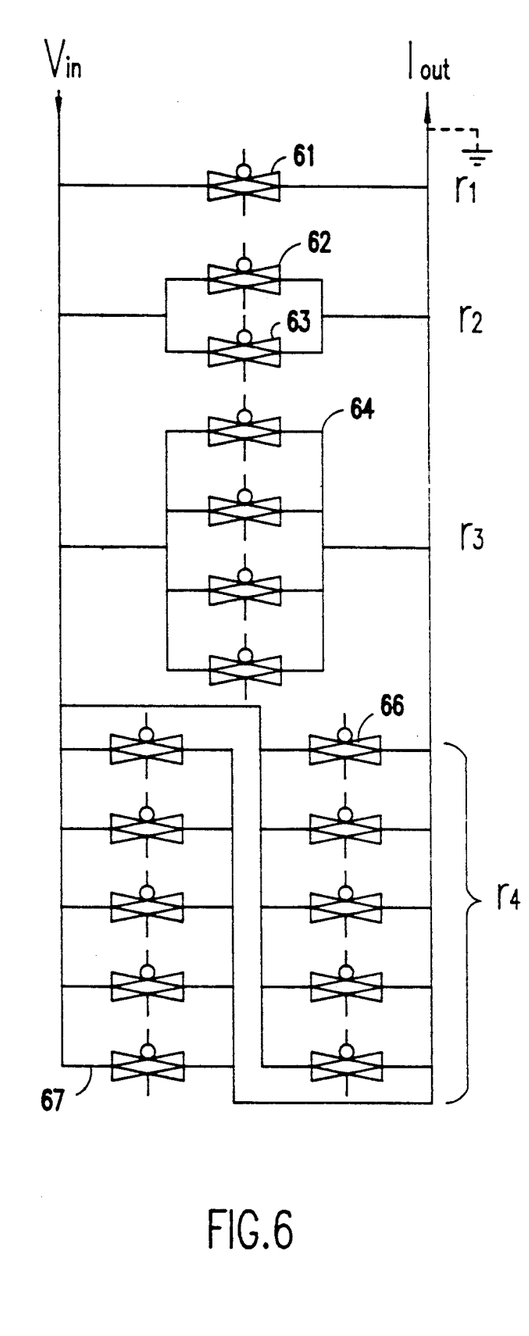

FIG. 6 shows a transmission gate array somewhat similar to that of FIG. 4 except that serial transmission gates 42, 43 have been replaced by a single transmission gate 61 and the number of parallel transmission gates (e.g. 62, 63) in the other groups is doubled, as shown at 64, 65 and 66. Although more complex, this array is preferred due to high linearity resulting from uniformity of device formation and operating conditions.

From the above, it is seen that the arrangement of FIG. 3 provides an electronically controllable resistance which can be integrated on a chip with a digital memory at small size and which provides a hybrid circuit permitting direct modulation of an arbitrary (e.g. analog) signal by a digital signal representing a desired modulation weight.

It should be noted that, as in the embodiment of FIG. 4, above, operating conditions may have an effect on the resistance developed by the invention and these effects may or may not be significant in a particular circuit or application of the invention. For instance, if operating conditions may be closely controlled or linearity is not critical, almost any type of transmission gate (e.g. JFET, PMOS, NMOS, bipolar transistor, etc.) can be used. However, for widest applicability, it is deemed preferable to use transmission gates which will present a relatively constant resistance for a relatively wide range of applied voltages (e.g. a voltage-independent resistance characteristic).

In this regard, a JFET embodiment of an ECR is described in "Analog Hardware Implementation of Neocognitron Networks" by R. M. Inigo, Allen Bonde, Jr. and Bradford Holcombe, SPIE Tech. Symp. on "Aerospace Sensing" Proceedings of Conference on Applications of Artificial Neural Networks, Apr. 18–20, 1990, and in "Self-Adjusting Weights for Hardware Neural Networks" by the same authors, published in Electronics Letters, Vol. 26, No. 19, Sep. 13, 1990, both of which are hereby fully incorporated by reference. However, in this JFET embodiment, the gate input volta $V_{GS}$ was limited to less than one volt in order to obtain a linear voltage/current relationship from the JFET, as depicted in FIG. 9 of the former article.

As is well-understood in the art, regardless of the transistor technology employed, a transistor will exhibit a variable resistive characteristic over a given range of control voltages, sometimes referred to as the triode or ohmic region, and a substantially constant low resistance for other control voltages where the transistor is saturated, sometimes referred to as the saturation region. In the above-incorporated articles, the limitation of the control voltage, and, hence, the limitation of voltages which may be applied across the conduction terminals of the transistor was necessitated by the extent of the triode region. This limitation and the variability of resistance with control voltage are characteristic of any transmission gate formed by a single transistor. While it may be desirable to use single transistor transmission gates where each transistor is operated in the triode region in order to minimize chip space and/or device count, in accordance with the invention, the limitations imposed by single transmission gates regarding operating conditions and variation from linearity are regarded as relatively severe.

In accordance with the invention, several things can be done to avoid these limitations. For convenience, the following forms of transmission gates will be referred to as "extended linearity transmission gates".

If the use of additional chip space is available, a series fixed resistance can be provided for each transistor and the transistors operated in either the triode region or the saturation region. In either case, the use of a fixed resistance would reduce the apparent variability of the sum of the resistance of the transistor and the fixed resistance in proportion to the relative values of each component. For instance, if the value of the fixed resistor was, say, an, order of magnitude larger than the value of the resistance of the transistor at its nominal design operating point (e.g. saturation), variation of resistance of the combination would be limited to a small fraction of the variation of resistance which would otherwise be observed from the single transistor transmission gate, alone. Thus, the linearity of resistance of the device can be extended over a greater range of operating conditions than would yield acceptable performance from a transmission gate comprising only a single transistor operating in the triode region.

Figure 7:
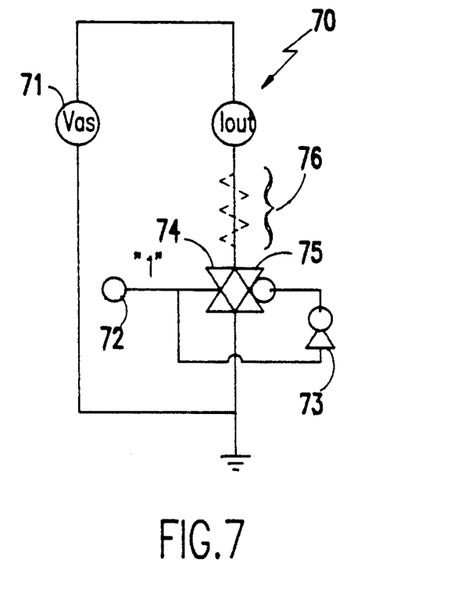
FIG. 7 is a diagram of the transmission gate according to a preferred embodiment of the invention.

Another alternative, in accordance with a preferred embodiment of the invention is to form the transmission gate from a plurality of transistors having different characteristics in order to extend the range of relatively linear operation. In particular, a complementary pair of field effect transistors (FETs), as illustrated in FIG. 7, can be used to obtain a high degree of linearity of operation. Moreover, by manipulating the dimensions of the channel width and length, a wide range of "on" resistances can be obtained with good on-chip and chip-to-chip consistency and high manufacturing yield. Such pairs of transistors may be formed in accordance with a number of technologies such as JFETs, MOSFETS, and MESFETs and with different materials including silicon and gallium arsenide. Complementary pairs of transistors can provide this desirable degree of linearity because of the complementary conductivity types of the channel material and the fact that, at low voltages, the electrons in one of the transistors will be more mobile and at higher voltages, the mobility of the holes in the other transistor will be increased. Therefore, one or the other of the transistors of the complementary pair will be operating at or near saturation whenever the transmission gate is biased to an "on" condition and the resistance of the combination will be governed substantially by channel dimensions. Although additional transistors must be formed, chip space is conserved by reduction of channel dimensions and the overall size of the transistors to obtain desired values of resistance, preferably on the order of several thousand ohms, and additional fixed resistances are not necessary, although they could certainly be provided if higher resistance values were desired.

A particularly preferred form of extended linearity transmission gate in the form of a complementary pass transistor pair is the CMOS transmission gate. CMOS transmission gates are well-suited to use as a transmission gate and an exemplary form of a CMOS transmission gate is illustrated in FIG. 7. Transmission gate 70 will have a control input 72 which will preferably receive a voltage representing a "0" or "1" logic value. A signal to be modulated is depicted as $V_{ds}$ source 71. The control signal is also applied to an inverter 73. The CMOS transmission gate 74, 75 includes both an NMOS transistor 74 and a PMOS transistor 75. As will be understood by those conversant with the semiconductor art, PMOS and NMOS transmission gates could be formed by either of these transistors 74, 75, alone. It should also be noted that, although it is not preferred for purposes of implementation of the ECR in a neural processor, an auxiliary resistor 76, shown in phantom lines, could be included in series with the transmission gate, regardless of the specific form or technology chosen for the transmission gate.

Figure 8:
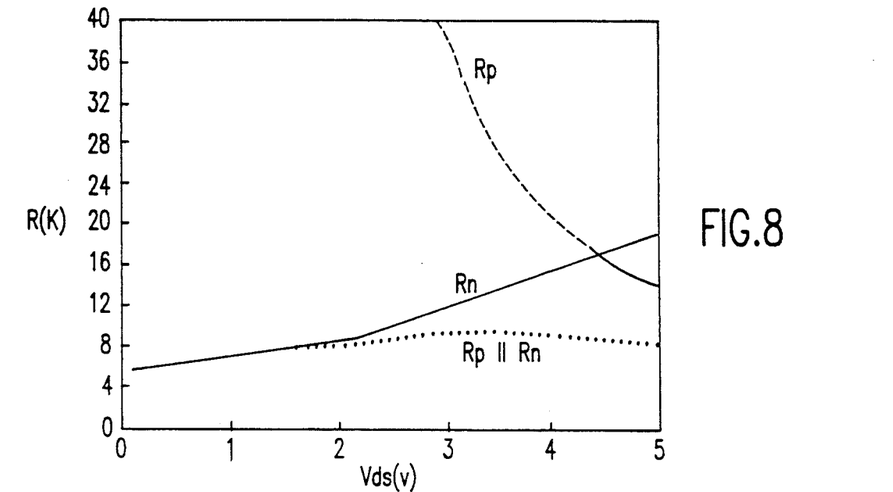
FIG. 8 is a plot of values of resistance of PMOS, NMOS and CMOS transmission gates as a function of $V_{ds}$.

CMOS transmission gates are deemed particularly suitable for such an application because of the relative conductance characteristics which are shown in FIG. 8. FIG. 8 which shows a plot of the relative resistance of PMOS (Rp), NMOS (Rn) and CMOS (Rp ‖ Rn) transmission gates having similar channel geometries for different values of $V_{ds}$. While Rp and Rn are seen to be voltage dependent, Rp ‖ Rn is reasonably constant. In even sharper contrast, JFETs can only be used at $V_{ds}$ values under one volt, limiting the amplitudes of signals which can be modulated and making a neural network or other circuit fabricated therewith to be sensitive to noise. It should also be noted from FIG. 8 that only values of $V_{ds}$ of 0-5 volts are shown since the logic input controls will often be similarly limited. However, it is expected that if higher power supply voltages are used, together with correspondingly higher logic signal voltages, the ECR of the present invention could be used over a much wider range of voltages, such as 0 v–15 v or more depending on feature size, typical of commercially available CMOS devices.

Figure 9:
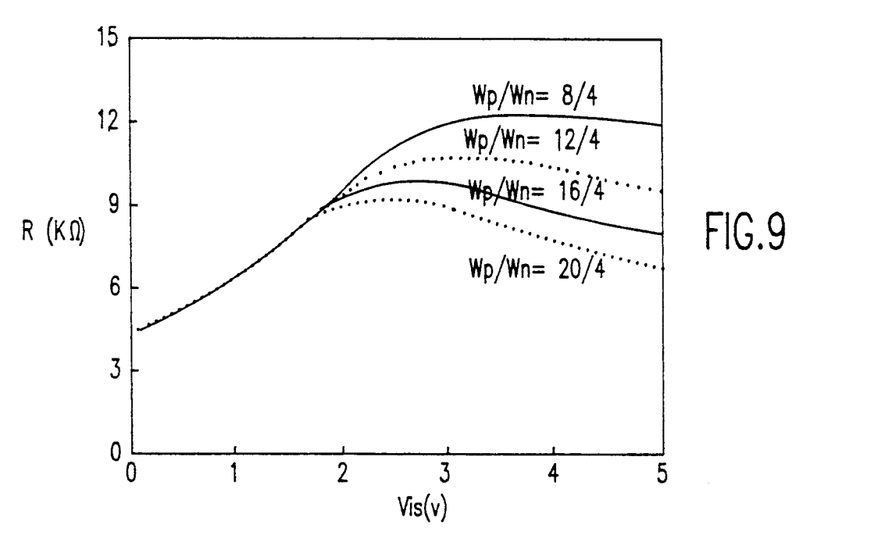
FIG. 9 is a plot of values of resistance for CMOS transmission gates versus $V_{ds}$ for differing ratios of PMOS channel width (Wp) and NMOS channel width (Wn)

Also, due to the disparity between the shapes of the Rp and Rn curves of FIG. 8, it has been determined that the range of voltages over which the resistance of a CMOS transmission gate will be relatively constant can be increased by adjustment of channel geometries. If, for purposes of comparison, a constant resistance range (CRR) is defined as the range of $V_{ds}$ voltages over which the resistance will not fall below 90% of the maximum resistance and Wn (NMOS channel width), Lp (PMOS channel length) and Ln (NMOS channel length) are held equal at 4 μm while Wp (PMOS channel width) is varied, resistance of Rp ‖ Rn will vary as shown in FIG. 9, particular values of which are tabulated in FIG. 10. Since it is desirable to maximize CRR and minimize the $R_{max}/R_{min}$ ratio, it is deemed preferable for the ratio of Wp/Wn to be about 3. It should also be noted from FIG. 9 that the resistance value changes about 100% between 0 and 2.5 V and best precision occurs at higher voltages, indicating the substantial constraints imposed on operating conditions if the transmission gate array of FIG. 4 (in which the two series connected resistors operate at a reduced voltage) is adopted. The CRR, as defined above, cannot be maintained for increased numbers of serial resistances which would further decrease operating voltages.

Figure 11:
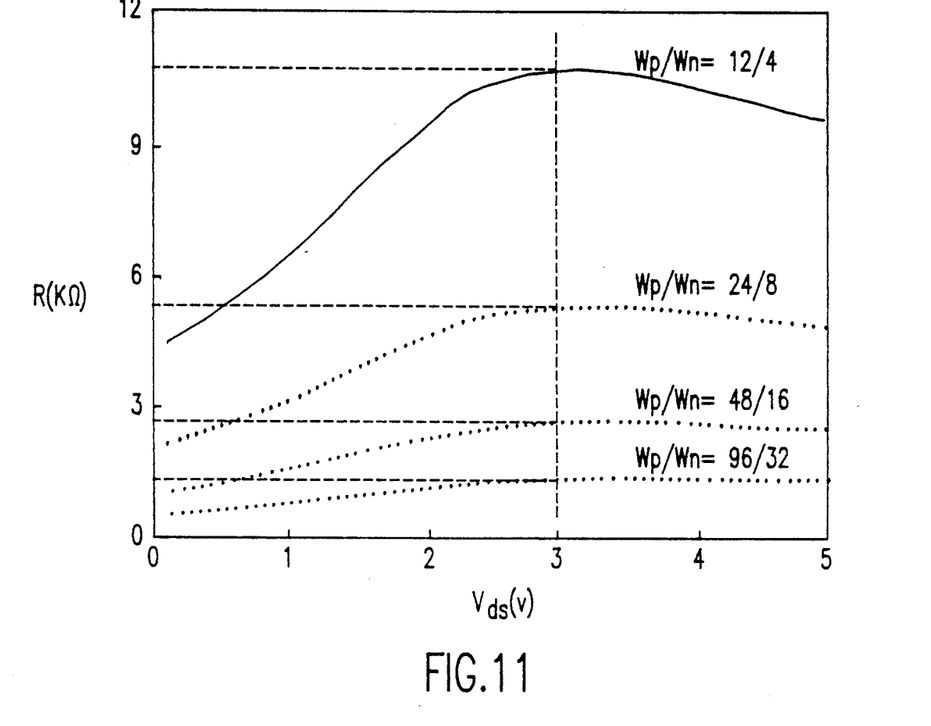
FIG. 11 is a plot of values of resistance for CMOS transmission gates of differing widths but having a constant Wp/Wn ratio as a function of $V_{ds}$.
Figure 12:
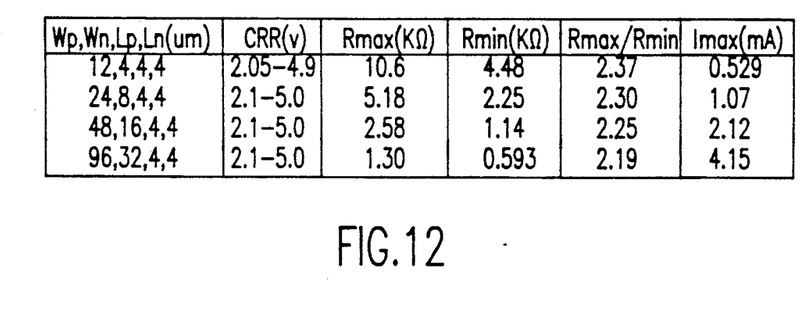
FIG. 12 is a table summarizing particular parameters based on the plots of FIG. 11.

With regard to the transmission gate array of FIG. 5, which, as indicated above, is subject to non-linear scaling effects with changes in channel width, shown for a constant Wp/Wn=3 ratio in FIG. 11, it is seen that the curves have different shapes at higher values of $V_{ds}$ and proportionality is not accurately maintained between the curves. The plots of FIG. 11 can be interpreted by a comparison of resistance along a vertical line corresponding to a particular $V_{ds}$, as shown by dashed lines corresponding to a $V_{ds}$ of 3 v. The resistance is seen to vary by several percent from proportionality. As an approximation of the non-linearity due to scaling, $R_{max}$ values can be compared in the table shown in FIG. 12.

A larger non-linearity will be observed at lower voltages approaching $R_{min}$. Nevertheless, in some applications, a lower tolerance may be acceptable and, in any event, some improvement in linearity should be obtainable if the fabrication parameters are known in advance so that some variation in the channel widths can be made.

It should also be noted, as an incident of design of ECRs in accordance with the present invention that, while a high degree of linearity is preferable, the resolution will depend upon the number of bits provided by the digital memory. As a matter of design, it should be noted that the precision of the resistor provided by the ECR of the invention depends on both the number of bits and the precision of the component gates. For example, for a six bit ECR having a 1KΩ maximum resistance (e.g. each of the 63 transmission gates presenting a 1KΩ resistance), the least significant bit (composed of 32 parallel 1KΩ resistances) will be able to effect a change of 31.25 Ω. However, if each of the 1KΩ transmission gate resistance values is only accurate to ±5%, then the value of the most significant bit is only accurate to ±50Ω, which is larger than the resolution of the least significant bit. Therefore, the use of a six bit ECR would not be justified unless the tolerance of resistance values of the individual resistances were to be held to a lower value.

The basic resistance range over which the ECR will operate can be determined by alteration of channel length. However, the amount of current drawn may make the power dissipation too great for the ECR, if formed by integration on a single chip, due to metal migration and other thermally related phenomena, depending on the package design and other thermal considerations, well understood in the art. Conversely, long channel lengths consume excess chip space and reduce currents to levels where noise may be increased. For that reason, it is desirable to use higher W/L ratios for smaller resistance ranges and lower W/L ratios for larger resistance ranges.

In view of the numerous forms which the ECR may take, in accordance with the invention, to accommodate particular design considerations, the preferred methodology for fabricating the ECR will be outlined:

a) Choose the minimum desired ECR precision (e.g. tolerance).

b) Choose the starting NMOS channel width $W_n$ and length $L_n$ and threshold voltage $V_{thn}$ and choose the starting PMOS channel width $W_p$ and length $L_p$ and threshold voltage $V_{thp}$.

c) Use a circuit emulation program, such as SPICE, to determine the PMOS resistance, $R_p$, versus the drain to source voltage, $V_{ds}$. This is done by effectively connecting the transistor between a variable voltage source and ground and calculating the equivalent resistance as the ratio of $V_{ds}/I_{out}$ for different values of $V_{ds}$ over the range of interest.

d) Determine the NMOS equivalent resistance in a manner similar to that of step c.).

e) Calculate the equivalent resistance in a transmission gate by calculating $R_p \| R_n$.

f) Determine $R_{max}$ over the range of $V_{ds}$.

g) Calculate the constant resistance ratio (CRR) as the range of values within two times the precision of the maximum resistance.

h) Vary the values of $W_n$, $W_p$, $L_n$, $L_p$, $V_{thn}$ and $V_{thp}$ and repeat steps a)-h) to find an optimum set of parameters for maximizing CRR and precision.

The SPICE circuit emulation program referred to above is set forth in detail in "Semiconductor Device Modelling in SPICE", Paolo Antognetti and Giuseppe Massobrio, editors, McGraw-Hill, 1988, hereby incorporated by reference.

A prototype of the ECR according to the invention has been fabricated in accordance with a design developed by such simulation and using the previously described parameters for channel dimensions. Four chips were manufactured and each chip contained six three-bit ECRs and two four bit ECRs. Some changes in manufacturing parameters, specifically, $V_{thn}$ and $V_{thp}$, were imposed by the chip foundry which fabricated the prototype devices and, for purposes of comparison with the simulated results, the new parameters were substituted and further simulations run, as will now be discussed for comparison with the original design and to confirm the methodology described above.

Figure 13:
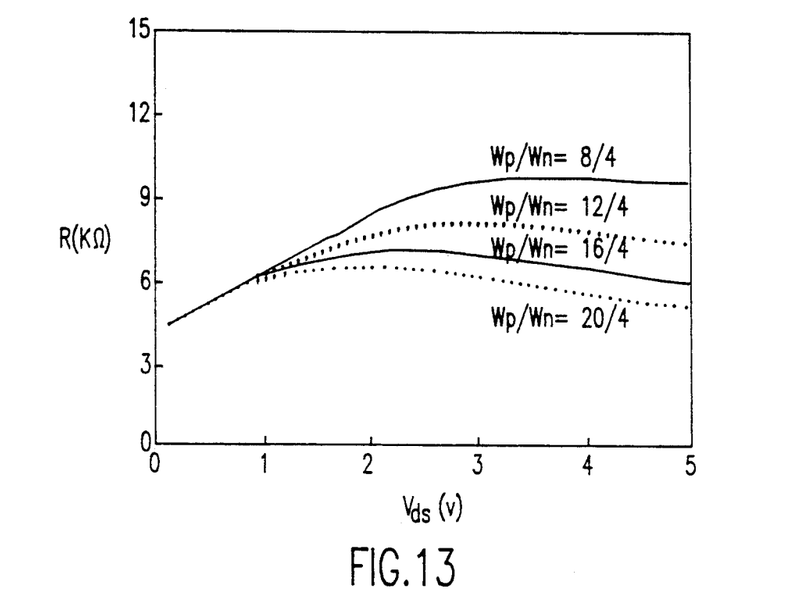
FIG. 13 is a plot similar to FIG. 9 using different parameters according to a SPICE level three simulation.
Figure 15:
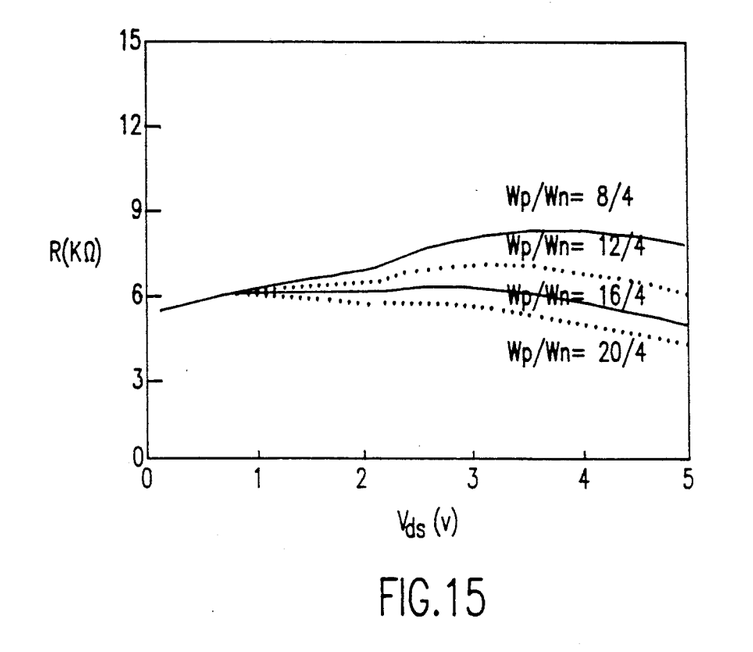
FIG. 15 is a plot similar to FIG. 9 using different parameters according to a SPICE level two simulation.

FIG. 13 is a plot of resistance values versus $V_{ds}$ for channel lengths Lp=Ln=4 μm and several different channel width ratio Wp/Wn values using a SPICE level 3 simulation. When compared to the graph of FIG. 9, this simulation shows that the new parameters provide a more nearly constant resistance across the range of $V_{ds}$. If the threshold voltage parameters are controlled, it is anticipated that even greater linearity can be achieved. Also, in original simulations using SPICE level 2 simulations, resulting data did not converge. However, using the new parameters SPICE level 2 simulations did converge and are shown in FIG. 15. Interestingly, the level 2 simulations suggest a more nearly constant resistance over the range of values of $V_{ds}$ than the level 3 simulations.

Figure 10:
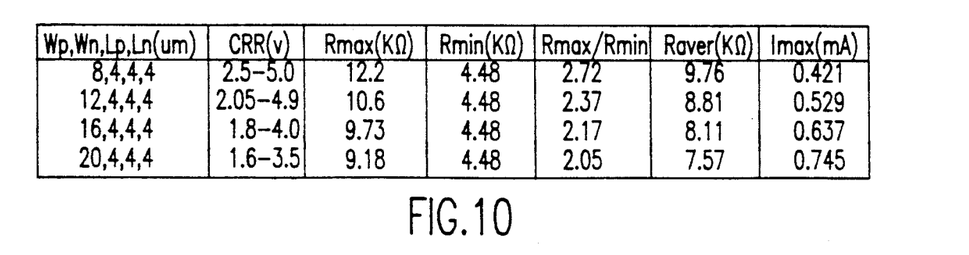
FIG. 10 is a table summarizing particular values of parameters based on the plots of FIG. 9.
Figure 14:
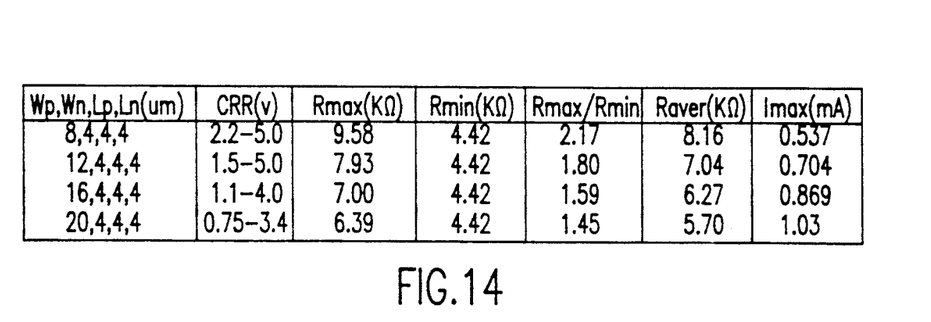
FIG. 14 is a table summarizing particular parameters based on the plots of FIG. 13.
Figure 16:
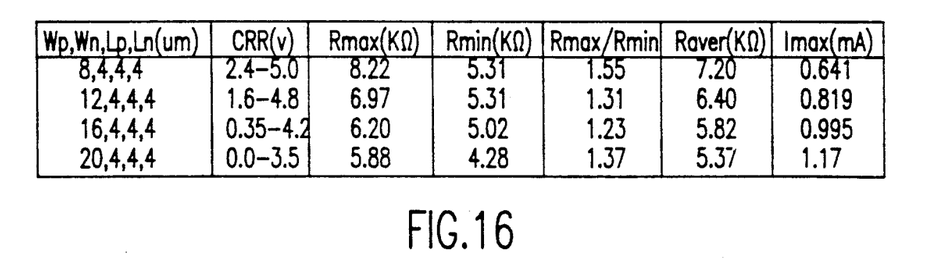
FIG. 16 is a table summarizing particular parameters based on the plots of FIG. 15.

As with FIGS. 9 and 10, relevant data derived from FIGS. 13 and 15 are shown in the tables of FIGS. 14 and 16, respectively, which can be analyzed in the manner done above with regard to FIG. 10. The significant result of this comparison is that while SPICE level 3 simulations indicate a Wp/Wn ratio of 3:1 to be the best choice, SPICE level 2 simulations indicate a ratio of 4:1 to be preferable, yielding improved CRR ranges and $R_{max}/R_{min}$ ratios. It is anticipated, however, that under different manufacturing conditions or technologies ratios from 1:1 to 6:1 may be employed.

Figure 17:
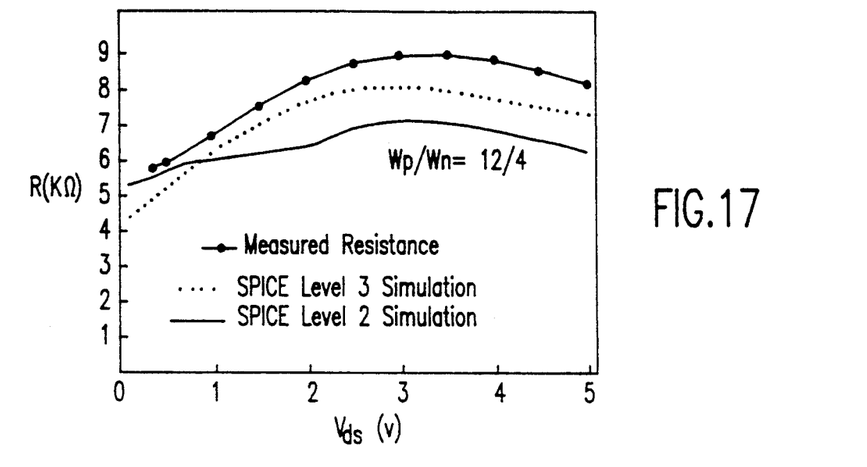
FIG. 17 is a composition of measured values with curves from FIGS. 13 and 15, and FIGS. 18 and 19 show measured resistance and conductance values produced by the invention.

To evaluate the modeling provided by these simulations, measurement of the prototype devices were made and the results shown in FIG. 17, superimposed on corresponding curves from FIGS. 13 and 15. The vertical lines on the measured resistance are error bars equivalent to one standard deviation and were taken on all four prototype chips using a counter value of one (to cause conductance through only a single transmission gate). The close similarity of the measured curve to the curve derived from the SPICE level 3 simulation of FIG. 13 demonstrates that that model is more appropriate than SPICE level 2 simulation. Moreover, this similarity indicates the utility and efficacy of simulation, using this model, as a design tool in designing variations of the ECR according to the invention for other applications.

Figure 18:
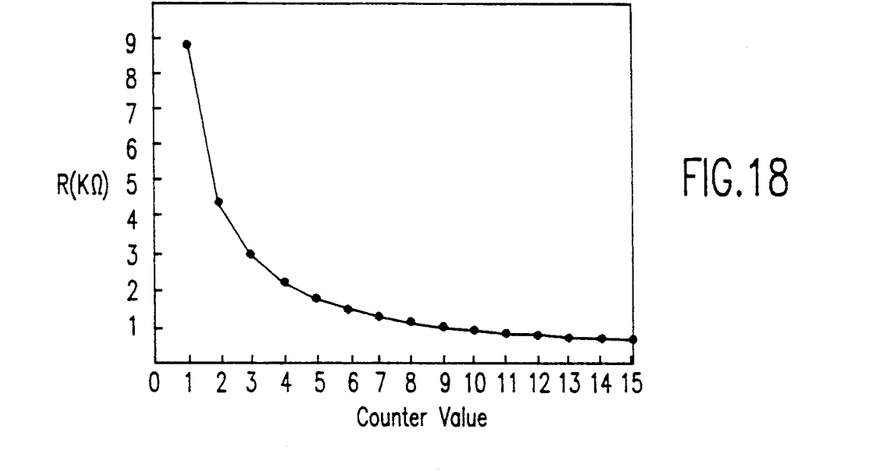
Figure 19:
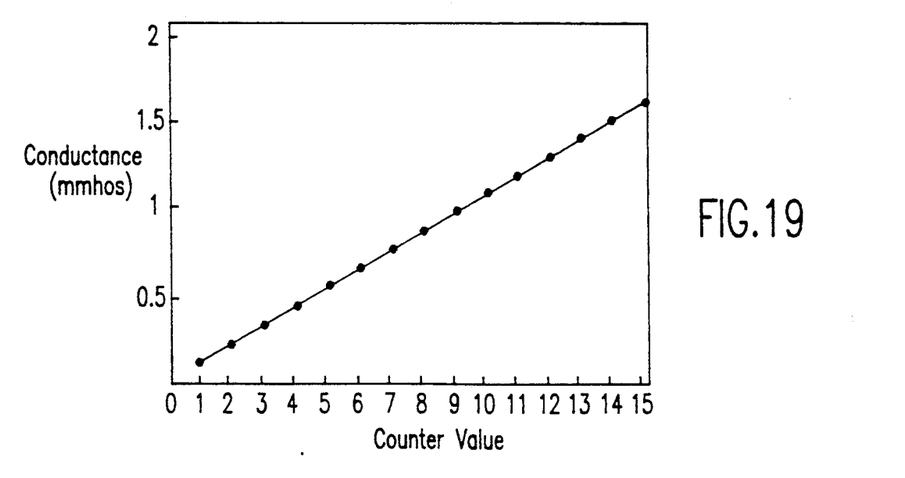

FIG. 18 shows measured resistance values for different digital memory values. As can be appreciated, the curve joining these measured values is approximately logarithmic. Recalling that in the neural processing element of FIG. 1, the weight used for modulating the input signal is the conductance of the ECR, the conductance computed from the measured resistance is shown in FIG. 19 to be very precisely linear.

In view of the above, a wide variety of ECR embodiments can be made in order to provide good performance in a wide variety of applications. It should be noted that the control of the ECR is dependent only on the digital storage structure and therefore, the response time can be made very fast. For example, using a LSSD counter as described above, the ECR can be incremented at a rate of once every 200 ns, reset in 800 ns and any value can be reached in 3200 ns for a four bit ECR (e.g. having sixteen discrete resistance levels). Using CMOS, each resistance level is within 1% of the specified resistance level, using the transmission gate array of FIG. 6. Use of CMOS transmission gates insures compatibility with other CMOS logic and analog devices and the ECR can be placed on a chip with other components for reduction of chip size, package count, noise and number of pins required per package. Such integration increases speed, reliability and design flexibility. Use of CMOS devices also allows the ECR to function over a large input voltage range and thus provides a good substitute for fixed and variable resistances of conventional designs. The ECR according to the invention requires only a digital input and no other specific conditions (e.g. heat, magnetic field, etc.) need be provided in order to change the resistance or otherwise program the ECR unless required by a particular type of PROM deemed desirable based upon a particular application, such as during manufacturing of electrical apparatus.

While the invention has been described in terms of a single preferred embodiment and illustrative variations thereof, those skilled in the art will recognize that the invention can be practiced with modification within the spirit and scope of the appended claims.

Having thus described our invention, what we claim as new and desire to secure by Letters Patent is as follows:

1. A resistor comprising, in combination,
   a digital storage means for storing at least two digits of a binary signal, and
   a transmission gate array comprising at least two parallel-connected transmission gates, each said transmission gate being associated with a respective electrical series resistance and controllable by a respective one of said at least two digits of said binary signal stored in said storage means.

2. A resistor as recited in claim 1, wherein at least one said transmission gate includes resistance means.

3. A resistor as recited in claim 1, wherein at least one said transmission gate exhibits an approximately linear voltage/current relationship.

4. A resistor as recited in claim 1, wherein at least one said transmission gate includes
   at least one transmission gate having complementary conductivity type field effect transistors.

5. A resistor as recited in claim 4, wherein respective ones of said complementary conductivity type field effect transistors in said at least one transmission gate have a ratio of respective channel widths approximately equal 3:1.

6. A resistor as recited in claim 4, wherein a ratio of channel width to channel length of one of said complementary conductivity type field effect transistors in said at least one transmission gate is approximately 3:1 and a ratio of channel width to channel length of another of said complementary conductivity type field effect transistors in said at least one transmission gate is approximately 1:1.

7. A resistor as recited in claim 6, wherein said ratios of channel width to channel length of said field effect transistors are greater than 3:1 and 1:1, respectively.

8. A resistor as recited in claim 6, wherein said ratios of channel width to channel length of said field effect transistors are less than 3:1 and 1:1, respectively.

9. A resistor as recited in claim 4, wherein said transmission gate array is integrated on a semiconductor chip.

10. A resistor as recited in claim 4, wherein said digital storage means and said transmission gate array are integrated on a common semiconductor chip.

11. A resistor as recited in claim 1, wherein said digital storage memory means includes a level sensitive scan design counter.

12. A resistor as recited in claim 1, wherein each of said electrical resistance is approximately the same resistive value and one of said at least two digits of a binary signal commonly controls a number of transmission gates which is a multiple of the number of transmission gates commonly controlled by another of said at least two digits of said binary signal, said multiple being an integral power of two.

13. A resistor as recited in claim 1, wherein a respective one of said electrical resistances has a resistive value which is approximately a multiple of a resistive value of another of said electrical resistances, said multiple being an integral power of two.

14. A resistor as recited in claim 2, wherein each of said resistance means has approximately the same resistive value and one of said at least two digits of a binary signal commonly controls a number of transmission gates which is a multiple of the number of transmission gates commonly controlled by another of said at least two digits of said binary signals, said multiple being an integral power of two.

15. A resistor as recited in claim 2, wherein a respective one of said resistance means has a resistive value which is approximately a multiple of a resistive value of another of said resistance means, said multiple being an integral power of two.

16. A resistor comprising, in combination,
a digital storage means for storing at least two digits of a binary signal, and
a transmission gate array comprising at least two extended linearity transmission gates, each said extended linearity transmission gate being associated with a respective electrical series resistance and controllable by a respective one of said at least two digits of said binary signal stored in said storage means.

17. A resistor as recited in claim 16, wherein at least one said extended linearity transmission gate includes resistance means.

18. A resistor as recited in claim 16, wherein at least one said extended linearity transmission gate exhibits an approximately linear voltage/current relationship.

19. A resistor as recited in claim 16, wherein at least one said extended linearity transmission gate includes
at least one extended linearity transmission gate having complementary conductivity type field effect transistors.

20. A resistor as recited in claim 19, wherein channel widths of respective ones of said complementary conductivity type field effect transistors in said at least one extended linearity transmission gate have a ratio of approximately 3:1.

21. A resistor as recited in claim 19, wherein a ratio of channel width to channel length of one of said complementary conductivity type field effect transistors in said at least one extended linearity transmission gate is of approximately 3:1 and a ratio of channel width to channel length of another of said complementary conductivity type field effect transistors in said at least one extended linearity transmission gate is approximately 1:1.

22. A resistor as recited in claim 21, wherein said ratios of channel width to channel length of said field effect transistors are greater than 3:1 and 1:1, respectively.

23. A resistor as recited in claim 21, wherein said ratios of channel width to channel length of said field effect transistors are less than 3:1 and 1:1, respectively.

24. A resistor as recited in claim 19, wherein said transmission gate array is integrated on a semiconductor chip.

25. A resistor as recited in claim 19, wherein said digital storage means and said transmission gate array are integrated on a common semiconductor chip.

26. A resistor as recited in claim 16, wherein said digital storage means includes a level sensitive scan design counter.

27. A resistor as recited in claim 16, wherein each of said electrical resistance is approximately the same resistive value and one of said at least two digits of a binary signal commonly controls a number of transmission gates which is a multiple of the number of transmission gates commonly controlled by another of said at least two digits of said binary signal, said multiple being an integral power of two.

28. A resistor as recited in claim 16, wherein a respective one of said electrical resistances has a resistive value which is approximately a multiple of a resistive value of another of said electrical resistances, said multiple being an integral power of two.

29. A resistor as recited in claim 17, wherein each of said resistance means has approximately the same resistive value and one of said at least two digits of a binary signal commonly controls a number of transmission gates which is a multiple of the number of transmission gates commonly controlled by another of said at least two digits of said binary signals, said multiple being an integral power of two.

30. A resistor as recited in claim 17, wherein a respective one of said resistance means has a resistive value which is approximately a multiple of a resistive value of another of said resistance means, said multiple being an integral power of two.

31. A method of controlling an electrical resistance including the step of
controlling at least one transmission gate associated with a predetermined series resistance with a digit of a multi-digit binary signal.

32. A method of controlling an electrical resistance as recited in claim 31, including the further step of
storing said multi-digit binary signal.

33. A neural processing element comprising at least two resistors, each said resistor having a terminal connected to a common node and comprising
a transmission gate array comprising at least two transmission gates, each said transmission gate being associated with a respective electrical series resistance and controllable by a respective digit of a multi-digit binary signal.

34. A neural processing element as recited in claim 33, further comprising a digital storage means.

35. A neural processing element as recited in claim 34, further comprising an amplifier means connected to said common node.

36. A neural processing element as recited in claim 35, wherein said digital storage means includes a level sensitive scan design counter.

37. A method of controlling an electrical resistance including the step of controlling at least one extended linearity transmission gate associated with a predetermined resistance with a digit of a multi-digit binary signal.

38. A method of controlling an electrical resistance as recited in claim 37, including the further step of storing said multi-digit electrical signal.

39. A neural processing element comprising at least two resistors, each said resistor having a terminal connected to a common node and comprising a transmission gate array comprising at least two extended linearity transmission gates, each said extended linearity transmission gate being associated with a respective electrical resistance and controllable by a respective digit of a multi-digit binary signal.

40. A neural processing element as recited in claim 39, further comprising a digital storage means.

41. A neural processing element as recited in claim 40, further comprising an amplifier means connected to said common node.

42. A neural processing element as recited in claim 41, wherein said digital storage means includes a level sensitive scan design counter.

43. A neural processing element as recited in claim 33 wherein at least one transmission gate of said transmission gate array includes said series resistance.

44. A neural processing element as recited in claim 39 wherein at least one transmission gate of said transmission gate array includes said series resistance.

* * * * *